United States Patent
Cruz-Hernandez et al.

(10) Patent No.: US 10,204,493 B2
(45) Date of Patent: Feb. 12, 2019

(54) HAPTIC FEEDBACK IN A HAPTICALLY NOISY ENVIRONMENT

(71) Applicant: Immersion Corporation, San Jose, CA (US)

(72) Inventors: Juan Manuel Cruz-Hernandez, Montreal (CA); Vincent Levesque, Montreal (CA); Jamal Saboune, Montreal (CA); Danny Grant, Laval (CA); Robert Lacroix, Saint-Lambert (CA); Abdelwahab Hamam, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 15/486,583

(22) Filed: Apr. 13, 2017

(65) Prior Publication Data

US 2017/0221325 A1   Aug. 3, 2017

Related U.S. Application Data

(63) Continuation of application No. 14/855,471, filed on Sep. 16, 2015, now Pat. No. 9,659,468.

(51) Int. Cl.
*G08B 6/00* (2006.01)
*B25F 5/00* (2006.01)
(Continued)

(52) U.S. Cl.
CPC ............ *G08B 6/00* (2013.01); *B23B 49/00* (2013.01); *B25F 5/00* (2013.01); *B60C 9/00* (2013.01);
(Continued)

(58) Field of Classification Search
CPC .... B60W 50/16; G06F 3/016; B06B 2201/72; B06B 2201/73; G08B 6/00; E21B 44/00; E21B 44/02–44/08; E21B 12/02
(Continued)

(56) References Cited

U.S. PATENT DOCUMENTS 2,701,037 A   2/1955   Lyon
4,644,335 A   2/1987   Wen
(Continued)

FOREIGN PATENT DOCUMENTS

EP   2 763 000   8/2014
EP   2 778 845   9/2014
(Continued)

OTHER PUBLICATIONS

Precision Microdrives, "Torque Wrench/ Gauge Tactile/ Haptic (vibration) Feedback", http://www.precisionmicrodrives.com/application-notes-technical-guides/torque-wrench-haptic-vibration-feedback, last downloaded Sep. 15, 2015.
(Continued)

*Primary Examiner* — Laura Nguyen
(74) *Attorney, Agent, or Firm* — Medler Ferro Woodhouse & Mills PLLC (57) ABSTRACT

A method for providing haptic feedback is provided for a device that produces haptic noise, such as a power tool with an electric motor that produces noises and vibrations while in operation. An environmental condition of the device can be sensed while the device is being operated and generating haptic noise. A haptic noise characteristic of the device can be determined. A haptic drive signal based on the environmental condition and haptic noise characteristic can be generated. The haptic drive signal can be applied to a haptic output device associated with the device.

4 Claims, 8 Drawing Sheets

(51) Int. Cl.
  *G06F 3/01* (2006.01)
  *B23B 49/00* (2006.01)
  *B60C 9/00* (2006.01)

(52) U.S. Cl.
  CPC ...... *G06F 3/016* (2013.01); *B23B 2260/0487* (2013.01); *B23B 2260/128* (2013.01)

(58) Field of Classification Search
  USPC .......................... 340/425.5, 438, 407.1, 680
  See application file for complete search history.

(56) References Cited

U.S. PATENT DOCUMENTS

| | | | |
|---|---|---|---|
| 4,831,365 A | 5/1989 | Thomas et al. | |
| 6,751,534 B2* | 6/2004 | Robichaux | B60L 11/14 340/425.5 |
| 7,245,231 B2* | 7/2007 | Kiefer | G08G 1/16 340/407.1 |
| 7,411,485 B2* | 8/2008 | Jarlengrip | B62D 15/029 340/438 |
| 8,344,862 B1* | 1/2013 | Donham | H04M 1/72547 340/407.1 |
| 8,405,522 B2 | 3/2013 | Shaffer et al. | |
| 8,942,892 B2* | 1/2015 | Veen | B60N 2/0232 340/407.1 |
| 9,202,351 B2 | 12/2015 | Levesque et al. | |
| 9,639,156 B2 | 5/2017 | Iorgulescu et al. | |
| 9,659,468 B2 | 5/2017 | Cruz-Hernandez et al. | |
| 2003/0055546 A1 | 3/2003 | Demerly et al. | |
| 2009/0167509 A1 | 7/2009 | Fadell et al. | |
| 2009/0167677 A1 | 7/2009 | Kruse et al. | |
| 2009/0259359 A1 | 10/2009 | Whitton et al. | |
| 2009/0305744 A1 | 12/2009 | Ullrich | |
| 2012/0081234 A1* | 4/2012 | Shaffer | G08G 1/167 340/905 |
| 2012/0229400 A1 | 9/2012 | Birnbaum et al. | |
| 2012/0229401 A1 | 9/2012 | Birnbaum et al. | |
| 2012/0249313 A1 | 10/2012 | Valfridsson et al. | |
| 2013/0078976 A1 | 3/2013 | Naftolin | |
| 2013/0169423 A1 | 7/2013 | Iorgulescu et al. | |
| 2014/0052401 A1 | 2/2014 | Riley et al. | |
| 2014/0104165 A1* | 4/2014 | Birnbaum | G06F 3/016 345/156 |
| 2014/0198068 A1 | 7/2014 | Lee et al. | |
| 2014/0245620 A1 | 9/2014 | Fankhauser et al. | |
| 2015/0014004 A1 | 1/2015 | Schubert et al. | |
| 2015/0350146 A1 | 12/2015 | Cary et al. | |
| 2016/0019767 A1* | 1/2016 | Ebe | G08B 21/02 340/425.5 |
| 2016/0299526 A1* | 10/2016 | Inagaki | G02F 1/133305 |
| 2016/0375346 A1 | 12/2016 | Czaja et al. | |
| 2017/0076564 A1 | 3/2017 | Cruz-Hernandez et al. | |

FOREIGN PATENT DOCUMENTS

| | | |
|---|---|---|
| EP | 2 778 851 | 9/2014 |
| EP | 2778850 A1 | 9/2014 |

OTHER PUBLICATIONS

European Search Report issued in EP application No. 14 15 9278, dated Jun. 5, 2014.
Extended European Search Report issued in EP 16192812.2, dated Mar. 8, 2017.
Extended European Search Report issued in EP Application No. 16166542.7, dated Aug. 19, 2016.
Notice of Allowance issued in U.S. Appl. No. 15/049,745, dated Sep. 14, 2017.
Notice of Allowance issued in U.S. Appl. No. 15/049,745, dated Sep. 26, 2017.
Office Action dated Jan. 25, 2018 for U.S. Appl. No. 15/841,227.
Notice of Allowance dated Jun. 7, 2018 in co-pending U.S. Appl. No. 15/841,227.

* cited by examiner

HAPTIC FEEDBACK IN A HAPTICALLY NOISY ENVIRONMENT

CROSS-REFERENCE TO RELATED APPLICATIONS

This application is a Continuation of U.S. application No. 14/855,471, filed Sep. 16, 2015, now U.S. Pat. No. 9,659,468, the content of which is hereby incorporated by reference in its entirety.

FIELD

One embodiment is directed to a haptic output system. More particularly, one embodiment is directed to a haptic output system for devices producing haptic noise.

BACKGROUND INFORMATION

Some handheld tools produce haptic output through their normal operation. For example, a power drill has a motor which produces vibrations and transmits those vibrations to the user through its handle. These vibrations caused by the drilling action can provide some haptic information. For example, a user that is familiar with the drill can discern when the drill's motor is going slower than usual for some amount of pressure applied to the trigger and material to be drilled. The user could guess that the bit is too hot or dull, that the material is harder than other materials, or that the drill's battery needs recharging. Rather than being left to guess, the user may want more meaningful haptic feedback while using a noisy tool. Although some haptic cues can be discerned, noisy tools do not provide many meaningful haptic cues, especially in comparison to their manual counterparts.

Typically, when a handheld tool such as a power tool operates, it produces a haptically noisy environment. That is, it provides such strong haptics naturally, that it can overpower other haptic feedback. For example, a user drilling through wood may not feel the vibration of a cell phone in their pocket while drilling, even though the location of the phone's vibration is not near the drill.

It may be convenient to a user to receive haptic feedback information from a tool that is in addition to haptic feedback naturally being provided by the tool. Conventional systems, however, can only provide haptic information when there is not another haptic output of the handheld tool to contend with.

SUMMARY

Embodiments include a method for providing haptic feedback for a device that produces haptic noise, such as a power tool with an electric motor that produces noises and vibrations while in operation. An environmental condition of the device can be sensed while the device is being operated and generating haptic noise. A haptic noise characteristic of the device can be determined. A haptic drive signal based on the environmental condition and haptic noise characteristic can be generated. The haptic drive signal can be applied to a haptic output device, which can also be referred to as a haptic output component, associated with the device.

DETAILED DESCRIPTION

Some devices, such as power tools, can produce noisy haptic output when used in their normal or intended way. For example, power tools typically generate a lot of haptic noise when they run by producing strong vibrations and loud sounds from their motors and the interaction with the material on which the power tool is operating. During operation of a power tool, noisy vibrations can vary in intensity but in general mask any feedback operators would get during the tool's operation. Constant vibrations can dull an operator's ability to perceive what little feedback is possible. Thus, the operator must rely on vision and their experience to determine that the tool is operating as intended. Operators with little experience, such as hobbyists or novices, do not have the skills to rely on the minute feedback typically provided. Even skilled and experienced workers can improve with helpful haptic feedback relating to the operation of such devices.

A haptic noise level is a background level of haptic noise in any environment. Haptic noise can have several characteristics, such as level, frequency, pattern, and so forth. For example, an air conditioning unit may operate and produce a level of auditory and vibrotactile noise at a fairly low level. Other items in the environment can also produce haptic noise that can be added together to generally increase the overall level of haptic noise in an environment. For example, building construction can produce noise and vibrations in nearby offices and a computer fan can produce noise and vibrations. Haptic noise can also result from the use of devices that contributes to the overall background noise. For example, a drill will produce noise and vibrations as haptic noise. A saw running simultaneously in the same environment will also produce noise and vibrations to contribute to the haptic noise of the environment. The haptic noise attributable to the use of a device can be characterized. This type of haptic noise is produced by a device through its operation and can come from the device itself or the materials with which the device interacts. Haptic noise can change based on where in an environment the haptic noise is being produced and how far away from the haptic noise source a user is. Also, if a user is in direct physical contact with a device producing haptic noise, the haptic noise level or intensity will be perceptibly higher.

A haptic signal is provided by a haptic output device. It can be considered the analog output of a haptic output device. The function of a haptic signal can be determined through its context of use. For example, a haptic signal produced in response to a user action can be considered "haptic feedback." A haptic signal produced to accompany a video signal that relates to the video signal content can be considered a "haptic effect." While a haptic signal can be seen as a desired haptic output, a haptic control signal can be considered a digital signal that controls the shape of the haptic output. In other words, a haptic control signal is provided by a memory or controller that contains information necessary to output the haptic signal on a haptic output device. A haptic control signal can be converted into a haptic drive signal which will be the actual voltage signal applied to a haptic output device. As used herein, a "tool" includes any useful device; a "power tool" is a tool that includes a motor.

An increase in haptic noise level can interfere with haptic perception barriers. Haptic perception barriers include thresholds for perception, attention breakthrough, and pain. The perception barrier is the barrier where a haptic signal becomes perceivable to a person. The attention breakthrough barrier is the barrier where a haptic signal will cause a person to become attentive to the haptic signal to perceive the haptic signal when a person's attention was previously on something else. The pain barrier is the barrier where a haptic signal will cause a person to perceive pain. Each of these barriers can be expressed in terms of a respective threshold such that when a haptic signal exceeds the threshold for perception, attention breakthrough, or pain, it breaks through each of the barriers respectively. In some cases, these thresholds may be the same. For example, if a person is in a quiet room, a vibrating phone can be both perceivable and have attention breakthrough at the same threshold. Conversely, if a person is in a haptically noisy room, to achieve attention breakthrough, a haptic output device may need to cause pain, so that the threshold for attention breakthrough and pain is the same and these two states of perception essentially overlap. Perception, attention breakthrough, and pain thresholds vary individually and depend on other factors, such as body temperature, hand temperature, stress level, hydration, and so forth.

The thresholds necessary to achieve perception, attention breakthrough, or pain can depend on environmental factors, including haptic noise. If the level of haptic noise is low, then in general these thresholds may be low. If the level of haptic noise is high, then in general these thresholds may be high. As a related example, suppose a person is in a dark room and the person's eyes have dilated to become accustomed to the dark room. Someone turns on the light. The level of light needed to cause pain is much lower than for a person in a brightly lit room.

Perception, attention breakthrough, and pain include both quantitative and qualitative aspects of a haptic signal. Quantitative aspects can include, among other things, intensity, magnitude, and/or level of a haptic signal. Qualitative aspects can include, among other things, frequency, pattern, and/or variability of a haptic signal. Quantitative and qualitative aspects of a haptic signal can be different for different haptic output devices. For example, a haptic signal provided at a higher intensity can also exceed the perception threshold, however, a haptic signal provided at a lower intensity can exceed the perception threshold depending on its location and character. If the character of the haptic signal is different than the character of the haptic noise, the intensity of the haptic signal may not be required to be as great as it would otherwise. Depending on the haptic output device, a haptic signal can be modeled to be of a different nature than the haptic noise in an environment. For example, a person drilling concrete may still feel a relatively light tap on the shoulder. Not only is the haptic signal (the tap) located in a different place than the majority of the haptic noise, but the character of the haptic noise is also different, being a tap rather than a vibration.

Similar to haptic signals, in addition to quantitative aspects of haptic noise, i.e., intensity or level, there are qualitative aspects of haptic noise. Qualitative aspects include different types of noise that can exist in a haptic noise environment. White noise provides a flat power spectrum with ideally equal power at all frequencies (but is not perceived as such). Pink noise provides a spectral power density that decreases by 3 dB per octave. Red noise (or Brownian noise) provides a spectral power density that decreases by 6 dB per octave. Blue noise provides a spectral power density that increases by 3 dB per octave. Violet noise provides a spectral power density that increases by 6 dB per octave. Grey noise is random white noise subjected to an equal loudness curve to provide the perception that it is equally loud at all frequencies. Other noise profiles exist that are variations of the above.

In some embodiments haptic noise profiles can be likened to a type of noise. A haptic signal can be selected to provide a haptic effect in a different noise type so as to be more distinct. For example, if a haptic noise is similar to blue noise, a haptic effect that provides a Brownian noise haptic output can be selected to be more perceivable.

Embodiments described herein provide haptic signals in an environment of haptic noise to overcome the threshold of perception, attention breakthrough, and/or pain. For example, embodiments provide meaningful haptic signals amidst haptic noise produced by a local device, such as a tool. Haptic signals provided can be notifications, haptic effects, or other haptic feedback related to the operation of the device, such as alerts, task feedback, or warnings of safety risks. Some embodiments also contemplate haptic noise in remotely operated devices, as discussed below.

Distinctive haptic signals provided through a handle or wearable device while using a handheld tool, for example, can serve as sensory augmentation haptic signals to provide the operator of the tool with information regarding the task at hand. For example, in the case of an electric drill, an information display can inform the user how deep they are drilling if they want to stop at a certain depth. A distinctive haptic signal, however, that informs the operator to stop drilling will enable the operator to keep their eyes on the work rather than on a display screen.

In some embodiments, a haptic output device, such as a haptic actuator, can be located on a tool. The haptic output device can be sized and located such that a haptic signal from the haptic output device can be designed to be perceivable by a user over ambient haptic noise and over haptic noise produced by the device. In some embodiments, a sensor can be located on the tool to detect, characterize, or model the haptic noise, operative conditions, or task-related status of the device. A haptic signal based on these environmental conditions of the tool and haptic noise can be provided as haptic feedback. Haptic feedback can be tailored to be distinct from the haptic noise, or in other words, overcome the threshold of perception, threshold of attention breakthrough, and/or threshold of pain. For example, a sensor can measure haptic noise as a vibrating frequency at a particular intensity. A haptic output device located on the tool can generate haptic feedback at a different frequency and/or intensity so as to be perceptible to a user.

Haptic noise can be sensed using sensors located on or near the device, such as those described below. In some embodiments, sensors can stand as a proxy for haptic noise and can be used to characterize the haptic noise. For example, a device that is producing haptic noise, unless in a vacuum, is also producing auditory noise. A microphone can be used to capture the auditory noise and estimate a level and character of haptic noise. Another example of a proxy sensor is a tachometer of a motor. The revolutions per minute ("RPMs") of a motor can be used to estimate the haptic noise. Another example of a proxy sensor is a voltmeter and/or ammeter attached to a motor. Voltage can be used to estimate rotational speed of a motor and current draw can be used to estimate load on a motor. Speed and load can be used to infer a level and character of haptic noise.

In some embodiments, a haptic noise profile for a device can be modeled or characterized using such sensors to provide a range of typical haptic noise produced by a device when operating. Modeling can use sensor data to directly detect haptic noise or detect haptic noise using proxy sensors. Modeling haptic noise can be generalized for a class of tools, such as power drills or saws. Specific models of tools can be designed to have certain haptic noise profiles.

In some embodiments, haptic noise profiles can be adjusted based on the interaction of the device with another material or surface. For example, a drill may be drilling through wood and the haptic noise can be altered compared to a drill drilling through metal.

In another embodiment, a haptic output device can be located remotely from the tool, such as on a wearable device, such as a wrist strap, or on a phone or on a haptic output device otherwise in contact with the user. A haptic signal such as a haptic effect can be played on the remote device. Haptic effects provided on the wearable device can be tailored to be distinct from the haptic noise, i.e., overcome the perception, attention breakthrough, or pain threshold barriers. In some embodiments a sensor can measure haptic noise as a vibrating frequency at a particular intensity. In some embodiments, a model of haptic noise in a particular device can be used to predict haptic noise generated by the device. A haptic output device located on the wearable device can generate haptic feedback at a different frequency and/or intensity to be more perceptible to a user. In some embodiments, a sensor can measure haptic noise which can be used to determine the most appropriate time to communicate using haptic effects, e.g., when the haptic noise level is at a lower intensity or at a particular frequency, or in other words, when the perception, attention breakthrough, and/or pain thresholds are within the capabilities of a haptic output device. The wearable device can be designed to be worn on the operator's dominant hand, non-dominant hand, or other parts of the body, such as on an operator's head (e.g., as in a hat or goggles), arms, ankles, shoes, shirts, or hands.

In another embodiment, a haptic signal can be provided by modifying a characteristic of the haptic noise. For example, haptic noise can be produced in a handheld tool by an electric motor used to operate the tool. A haptic signal can be provided using the source of the haptic noise. In the case of a motor, for example, the motor output can be modulated to speed up or slow down, stop and start, or stutter. In another example, the motor output can be dampened dynamically to alter a characteristic of the haptic noise, such as frequency or intensity, to generate a haptic signal. In some embodiments, a sensor can be located on the device to provide feedback about the haptic noise produced by the device.

As used herein, a wearable device is any device that can be worn by a user, such as a glove, hat, glasses, shoes, shirt, wrist strap, ankle strap, and so forth, and that is in contact directly or indirectly, permanently or intermittently, with a user's body part. A graspable (by the hand) device is also considered a wearable device even if it is only "wearable" so long as it is grasped, such as a phone or handle.

Figure 1A:
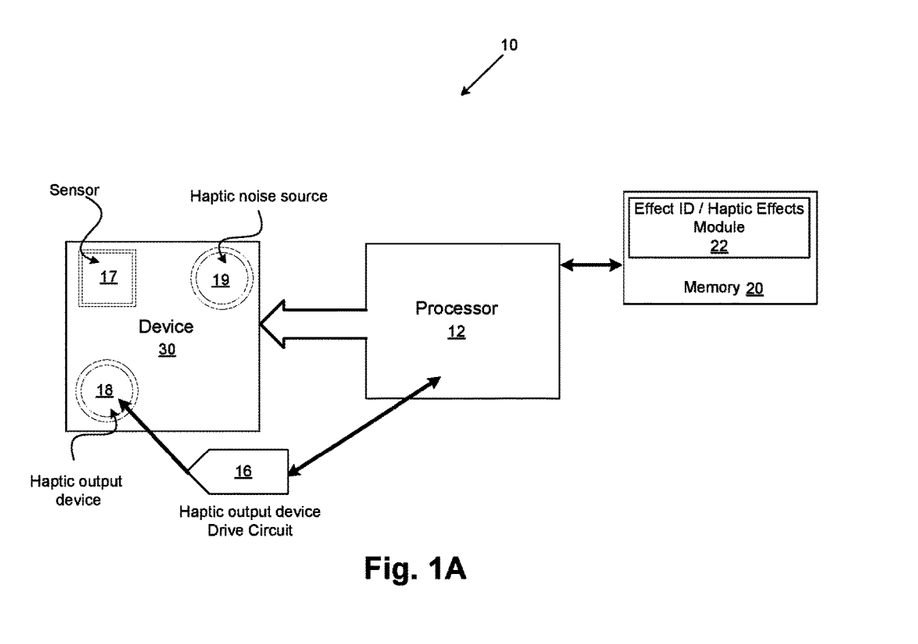
FIGS. 1a and 1B are block diagrams of a haptically-enabled system in accordance with one embodiment of the present invention.
Figure 1B:
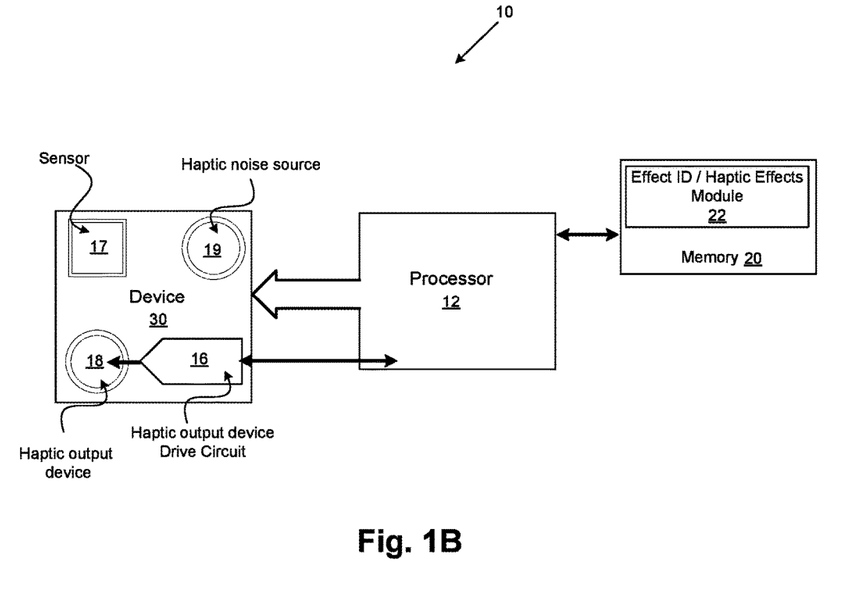

FIGS. 1A and 1B are block diagrams of a haptically-enabled system 10 in accordance with one embodiment of the present invention. System 10 can include a device 30 that produces haptic noise by a haptic noise source 19. For example, haptic noise source 19 can be a motor or the interaction of device 30 with materials such as wood. Internal to system 10 is a haptic signal output system that generates haptic signals on system 10. In some embodiments, a haptic signal can be generated by haptic noise source 19.

The haptic signal output system includes a processor or controller 12. Coupled to processor 12 is a memory 20 and a haptic output device drive circuit 16, which is coupled to a haptic output device 18 located on or in device 30. FIG. 1A, in an embodiment, illustrates haptic output device 18 located outside device 30, but which could be located on or coupled to device 30. In another embodiment, FIG. 1B illustrates haptic output device 18 located within device 30. Haptic output device 18 can include any type of haptic output device, including motors, actuators, electrostatic friction ("ESF") devices, ultrasonic frequency ("USF") devices, heating elements, and any other haptic output device that can be used to provide haptic feedback to a user. Where this application discusses outputting a haptic signal, such as a haptic effect or haptic feedback on a haptic output device, one of skill will understand that multiple haptic output devices or combinations of haptic output devices can be used instead of just one haptic output device.

Other such haptic output devices 18 may include flexible, semi-rigid, or rigid materials, including smart fluidic actuators, rheological fluidic actuators, Macro-Fiber Composite ("MFC") actuators, Shape Memory Alloy ("SMA") actuators, piezo actuators, and Micro-Electro-Mechanical System ("MEMS") actuators.

System 10 can include a sensor 17. Sensor 17 can detect or model haptic noise provided by haptic noise source 19. Sensor 17 can be any sensing device, such as, but not limited to, an accelerometer, an electrocardiogram, an electroencephalogram, an electromyograph, an electrooculogram, an electropalatograph, a galvanic skin response sensor, a capacitive sensor, a hall effect sensor, an infrared sensor, an ultrasonic sensor, a pressure sensor, a fiber optic sensor, a flexion sensor (or bend sensor), a force-sensitive resistor, a load cell, a LuSense CPS$^2$ 155 position and pressure sensitive sensor, a miniature pressure transducer, a piezo sensor, a strain gage, a hygrometer, a linear position touch sensor, a linear potentiometer (or slider), a linear variable differential transformer, a compass, an inclinometer, a magnetic tag (or radio frequency identification tag), a rotary encoder, a rotary potentiometer, a gyroscope, an on-off switch, a temperature sensor (such as a thermometer, thermocouple, resistance temperature detector, thermistor, or temperature-transducing integrated circuit), microphone, photometer, altimeter, bio monitor, camera, or a light-dependent resistor. In alternate embodiments, system 10 can include one or more additional sensors, in addition to sensor 17 (not illustrated in FIGS. 1A or 1B). In some of these embodiments, sensor 17 and the one or more additional sensors may be part of a sensor array, or some other type of collection of sensors. Sensor 17 can provide sensor information to processor 12. Sensor information from sensor 17 can be provided to processor 12 by conventional wired or wireless techniques.

Processor 12 may be any type of general purpose processor, or could be a processor specifically designed to provide haptic effects, such as an application-specific integrated circuit ("ASIC"). Processor 12 may be the same processor that operates the entire system 10, or may be a separate processor. Processor 12 can decide what haptic signals are to be played and the order in which the haptic signals are played based on high level parameters. A haptic signal may be considered "dynamic" if it includes some variation in the generation of haptic signals amongst haptic output device(s) or a variation in the generation of haptic signals based on a user's interaction with device 30 or some other aspect of system 10.

Processor 12 outputs haptic control signals to haptic output device drive circuit 16, which includes electronic components and circuitry used to supply haptic output device 18 with a haptic drive signal, such as the required electrical current and voltage to cause the desired haptic signal. System 10 may include more than one haptic output device 18, and each haptic output device may include a separate drive circuit 16, all coupled to a common processor 12. Memory device 20 can be any type of storage device or computer-readable medium, such as random access memory ("RAM") or read-only memory ("ROM"). Memory 20 stores instructions executed by processor 12. Among the instructions, memory 20 includes a haptic effects module 22 which are instructions that, when executed by processor 12, generate haptic control signals and subsequently haptic drive signals for haptic output device 18 that provide haptic signals, such as a haptic effect. Memory 20 may also be located internal to processor 12, or any combination of internal and external memory.

In some embodiments, haptic effects module 22, can be configured to have a preset haptic effect that can be identified by an identification number. Each preset haptic effect can specify which parameters (e.g., intensity, frequency, duration etc.) to adjust and their values given the situation that prompted the effect (e.g., given the haptic noise parameters or the urgency of the event or notification). In some embodiments, haptic effects module 22, can be configured to receive high-level parameters (e.g., effect type and intensity level) and determine the low level parameters (e.g., intensity, frequency, duration etc.) and values necessary to achieve the high-level effects.

In an example embodiment corresponding to system 10 of FIGS. 1A and 1B, an operator is using an electric saw such as device 30 to cut through reclaimed wood. The wood contains metal shrapnel that could be dangerous if encountered by the saw blade. The saw has a haptic output device 18, such as an actuator, embedded into the saw's handle to provide vibrotactile haptic feedback. The actuator operates at a different frequency than the saw's motor (i.e., haptic noise source 19). The saw is also equipped with a sensor 17, such as a metal sensor. As the operator starts to saw, the metal sensor detects a metal piece in the wood. As soon as sensor 17 detects the metal piece, a haptic signal is produced as series of strong distinctive vibrations can be felt by the operator on the handle as a distinguishing haptic effect. In some embodiments, the haptic signal can be configured to overcome the operator's threshold for perception, attention breakthrough, and/or pain. For example, the operator may be expecting that a haptic signal can be produced by the actuator. In some embodiments, the haptic signal can be configured to overcome the operator's attention breakthrough barrier. For example, the haptic signal may be configured to be distinctive enough to divert attention to the haptic signal. In some embodiments, the haptic signal can be configured to overcome the operator's pain barrier. For example, it may be extremely dangerous to saw through the shrapnel and pain may prompt the operator to react quicker to the haptic signal stimulus. In reaction, the operator can deviate the saw from the planned path to avoid the metal piece.

Figure 2:
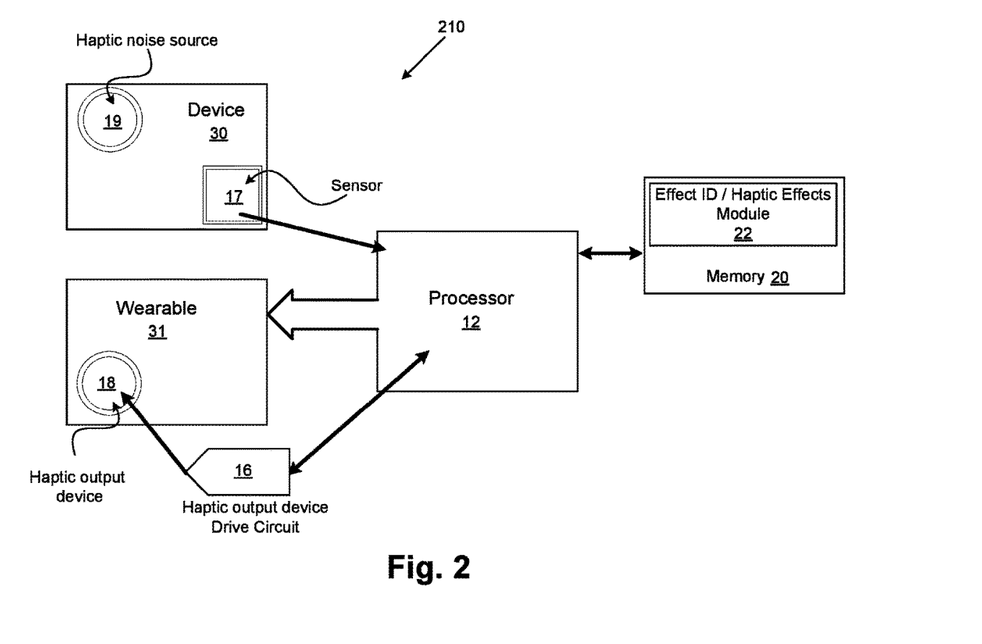
FIG. 2 and FIG. 2A are block diagrams of haptically-enabled systems in accordance with embodiments of the present invention.

FIG. 2 is a block diagram of a haptically-enabled system 210 in accordance with one embodiment of the present invention. System 210 is an alternative arrangement of the components of FIGS. 1A and 1B, and shares the same labels where applicable. For components of system 210 labeled the same as those in FIGS. 1A and 1B, the features and capabilities are the same as described above, except as noted below. Further, as described in FIGS. 1A and 1B, haptic output device drive circuit 16 can be located within, outside, or coupled with device 30/31.

Figure 2A:
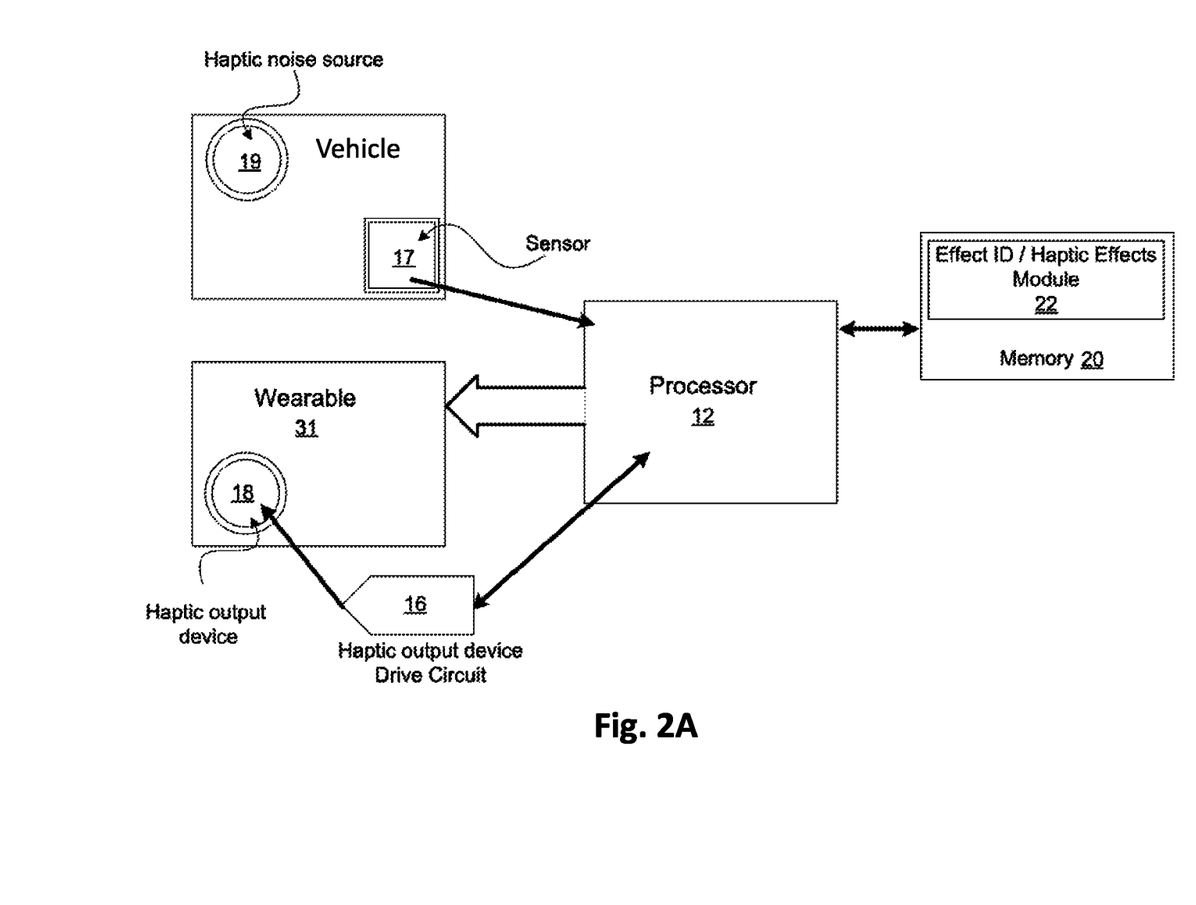

System 210 includes a wearable device 31. Wearable device 31 contains haptic output device 18 and interfaces with haptic output device drive circuit 16. In system 210, the haptic noise source 19 is located on or in device 30, such as a vehicle, as depicted in FIG. 2A. Processor 12 can be in wireless communication with wearable device 31.

In one example embodiment corresponding to system 210 of FIG. 2, an operator is planning on drilling a hole two inches deep with an electric drill. One way to measure stop depth is to measure two inches from the tip of the drill bit and put tape around the bit at that point on the shaft of the bit as a marker. However, in this case the conditions are not optimal to do that. The bit is small, so tape will not stick well, the lighting is poor, and sawdust may interfere with the operator's vision. Precision is needed. The operator has a deformable wearable device, such as wearable device 31 around his wrist. The device is capable of producing a haptic signal that is felt around the wrist as a squeeze. Moreover, the drill is equipped with a sensor 17, such as a proximity sensor. As drilling commences, the proximity sensor measures the penetration distance, and as soon as it measures two inches, a series of short and sharp squeezes is felt by the operator through the wearable device. The operator immediately stops drilling, achieving the desired result.

Figure 3:
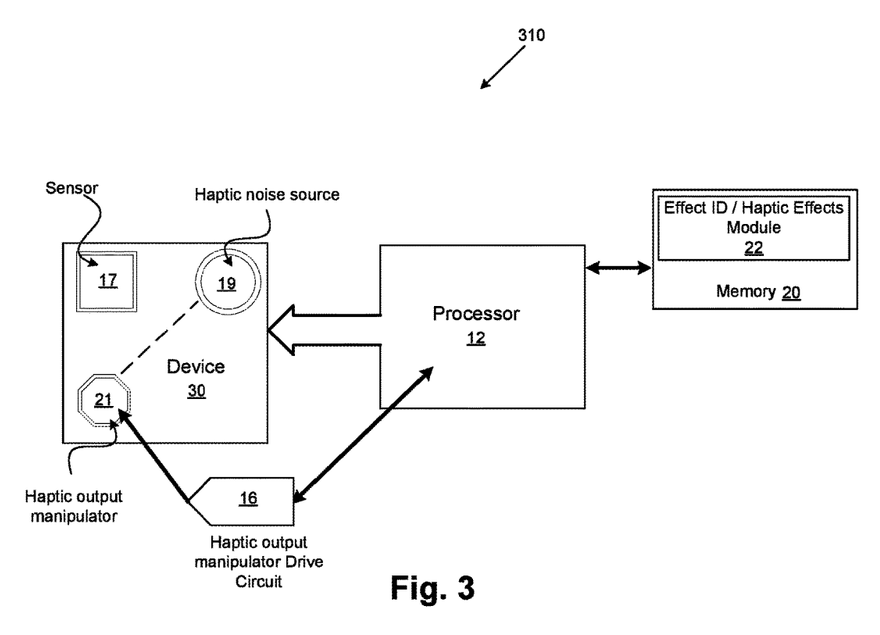
FIG. 3 is a block diagram of a haptically-enabled system in accordance with one embodiment of the present invention.

FIG. 3 is a block diagram of a haptically-enabled system 310 in accordance with one embodiment of the present invention. System 310 is an alternative arrangement of the components of FIGS. 1A and 1B and share the same labels where applicable. For components of 310 labeled the same as those in FIGS. 1A and 1B, the features and capabilities are the same as described above, except as noted below. Further, as described in FIGS. 1A and 1B, haptic output device drive circuit 16 can be located within, outside, or coupled with device 30.

In system 310, haptic output device 18 (e.g., of FIGS. 1A and 1B) can comprise a haptic output manipulator 21. Haptic output manipulator 21 can alter haptic noise source 19 directly or indirectly. For example, for direct manipulations, haptic output manipulator 21 can be connected to interrupt or control power provided to haptic noise source 19. In indirect manipulations, for example, haptic output manipulator 21 can be connected to absorber material (not shown) to dampen or change the haptic noise produced by haptic noise source 19 (even without altering haptic noise source 19 directly). Drive circuit 16 operates as described above with regard to FIGS. 1A and 1B, except does not directly drive a haptic output device, and instead drives haptic output manipulator 21.

In an example embodiment corresponding to system 310 of FIG. 3, an operator can operate a screw gun such as device 30 to drive a screw into drywall. The motor of the power tool decreases the torque setting as a haptic signal to assist the operator to avoid overdriving the screw. In another example, an operator of the screw gun is now driving a deck screw.

The vibration of the power drill is dampened, thereby notifying the operator that the screw is about to strip.

In some embodiments consistent with FIGS. 1, 2, and 3, haptic noise source 19 can be a controlled haptic output device for providing some haptic effects which would not normally be considered "haptic noise." For example, a haptic actuator native to a mobile device may correspond to haptic noise source 19. With regard to FIGS. 1A and 1B, in these embodiments, haptic output device 18 can be provided in addition to the native haptic noise source to provide other haptic effects, or with regard to FIG. 2, on a wearable device 31. With regard to FIG. 3, in this embodiment, the combination of drive circuit 16 and haptic output manipulator 21 may be implemented by processor 12 by causing haptic signals of the native haptic noise source to be altered before or after that other system's haptic output logic. For example, the haptic drive or haptic control signals sent to the native haptic noise source can be interrupted or altered. Or, for example, a haptic output manipulator can dampen or change the character of the haptic signal produced by the native haptic noise source.

Although the specific embodiments discussed herein may for convenience refer to power tools or handheld tools as examples, one of skill in the art will understand that the concepts discussed herein can also be applied to any "tool" or device that generates haptic noise. Such tools can include mobile devices that have a haptic output device, such as haptic noise source 19, that can be activated through its normal use (e.g., receiving a phone call or notification). Similarly, specific embodiments can also include power tools that are not handheld, but produce haptic noise that would tend to mask a haptic signal from a haptic output device.

Embodiments that are implemented using power tools can be part of "intelligent" tools using techniques described herein to provide haptic effects based on operative conditions of the tool. Power tools can contain intelligent components in a system such as system 10, 210, or 310. Intelligent tools can be connected together through the Internet of Things ("IoT") paradigm. This can facilitate communication between the power tool and wearable devices for the operator or others, such as the operator's supervisor. Intelligent tools in this context can be anything that has a haptic noise level associated with it. Sensors located on such intelligent tools can monitor the haptic noise, characterize the haptic noise, and provide a haptic noise profile that can be used to determine haptic signals that can exceed the thresholds of perception, attention breakthrough, and/or pain. Haptic noise profiles can be periodically or continuously updated and provided through an interface of the device to a controller or other device, or directly to a system such as system 10, 210, or 310.

Figure 4:
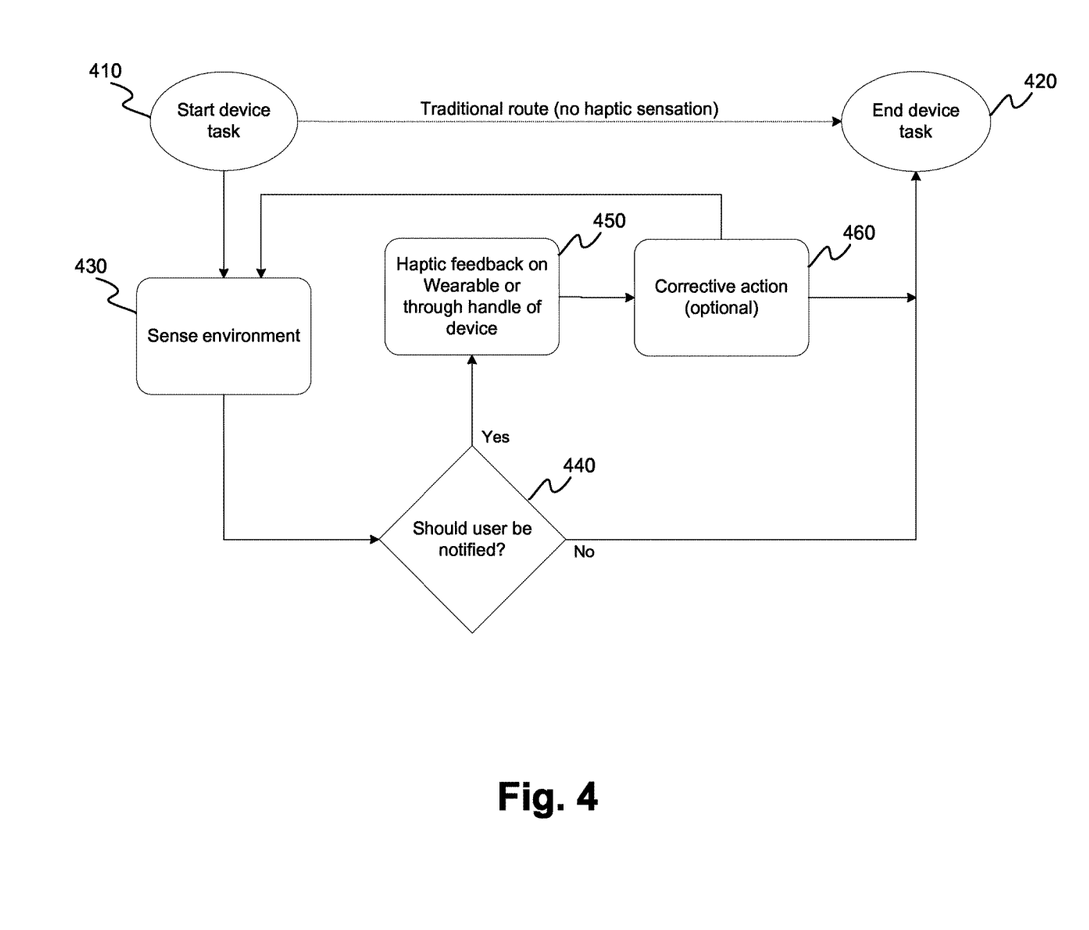
FIG. 4 is a flow diagram for providing a haptic effect in a haptically noisy environment in accordance with one embodiment.

FIG. 4 is a flow diagram for providing a haptic signal in a haptically noisy environment in accordance with one embodiment. In one embodiment, the functionality of the flow diagram of FIG. 4 (and FIG. 5 below) is implemented by software stored in memory or other computer readable medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 410, a tool task is started by a user in a haptically noisy environment. A haptically noisy environment is one where the thresholds of perception, attention breakthrough, and pain have been elevated due to haptic noise. In a traditional route with no additional haptic sensation beyond that provided naturally by the tool, the user would complete the tool task and the tool task would end at 420. In a route where additional haptic sensation is provided, at 430, a condition of the environment is sensed. Environmental sensing can be accomplished according to one or more sensors, such as sensor 17 of FIGS. 1-3. Environmental sensing can detect environmental conditions which are conditions related to the tool or its environment. For example, vibration and intensity of the haptic noise, location or orientation of the tool, operative status of the tool, or a task-related event can be used to determine a haptic signal to use as haptic feedback.

For example, environmental sensing can be used to detect characteristics related to the haptic noise. Noise characteristics can be used to determine what kinds of haptic signals to produce or when to produce them. Haptic signals can be tailored to be distinguishable over the haptic noise, for example, by being of a greater intensity and/or different frequency. In other words, haptic signals can be selected to exceed the thresholds of perception, attention breakthrough, and/or pain so as to be perceivable, have attention breakthrough, and/or produce pain. The selection of haptic signals can be accomplished based on the urgency of the user to receive and recognize the haptic signal. For example, low urgency haptic signals can be selected to meet the perception barrier threshold, while high urgency haptic signals can be selected to meet the pain barrier threshold. In some embodiments, haptic signals can be triggered at a certain time when the haptic noise is at a characteristic when it would be more desirable to do so, e.g., when haptic noise intensity is less than a previous state. Certain tools, for example, are used by repeatedly alternating between an action that causes significant haptic noise and a slight pause. Drilling, for example, is sometimes done with multiple short pushes. The system could wait for these attenuated periods of haptic noise to provide informative haptic signals. Similarly, the system can produce haptic signals during the low intensity parts of a low-frequency haptic noise. A chainsaw, for example, may produce a low frequency hum while idling. Haptic signals can be timed to occur in the short pauses in these vibrations to decrease the level or intensity of the haptic signal needed to achieve the desired thresholds to be perceived, have attention breakthrough, and/or pain, since at these times of lower haptic noise, these thresholds will also be lower.

Other examples include those already discussed above, such as a proximity sensor, metal sensor, or some other aspect of the environment.

In some embodiments, characteristics related to the haptic noise can be determined from modeled haptic noise for the particular device. For example, a drill using a particular motor can be modeled at a frequency and intensity and that information can be used for the same or similar model drill for providing distinguishable haptic signals, as described above. Another example includes modeling noise characteristics of a circular or reciprocating saw. Noise characteristics can be stored as a noise profile for each device.

In some embodiments, environmental sensing can be used to detect characteristics of the haptic noise and use those characteristics to accentuate user-perceived haptic signals already present in the haptic noise. For example, when using a drill, a user can sense feedback from the drill that its motor is turning slower than typical. From this sensation, the user can guess that the battery is nearly spent, the drill bit is dull, the materials are hard, and so forth. This naturally occurring haptic signal can be accentuated using haptic effects. In some embodiments, the haptic noise can be accentuated by amplifying the haptic noise to make it easier to perceive or otherwise make it more distinctive. In some embodiments, the haptic noise can be accentuated by providing an additional haptic output designed to draw the user's attention to the haptic noise. For example, if the battery is nearly spent, power to the motor can be interrupted repeatedly using a haptic output manipulator, such as haptic output manipulator 21 of FIG. 3. For example, if the material being drilled is hard, a haptic effect can be played on a wearable device such as wearable device 31 of FIG. 2 to indicate the user should apply less pressure or reduce drill speed. For example, if a drill bit hits a nail or other foreign object embedded in the drilled material, a vibration may occur that is not common, such as repeated "tic" sounds as the cutting edges of the bit hit the foreign object. Filters can be used to isolate and amplify this change in the haptic noise. A haptic output device can be used to play a louder or more distinctive version of the isolated haptic noise as a haptic signal so that it feels the same as the original haptic noise, but is more perceivable or exceeds the thresholds for perception, attention breakthrough, and/or pain.

In some embodiments, sensors can be used to detect precise environmental conditions. For example, some medical devices, such as a medical drill, are typically used while their operators are required to wear multiple layers of gloves, a mask, a face shield, and other protective gear, all of which can reduce sensation and correspondingly increase the thresholds for perception, attention breakthrough, and pain for haptic noise that acts as a native haptic signal of operating the device, i.e., natural device feedback. Moreover, medical equipment must be clean and sterile. Using tape on a drill bit would be inappropriate to determine drilling depth distance. A proximity sensor or fluoroscopy sensor can sense the environmental condition of the drill, i.e., distance to target depth, and cause the operator to be alerted by a haptic output device, such as a wearable device.

Turning back to FIG. 4, at 440, logic determines whether the user of the tool should be notified based on the sensed environment. For example, if a condition of the environment is such that the user should be notified, then the flow would determine as such, and an instruction can be given to provide a haptic signal. An instruction to provide the haptic signal can be based on the environmental condition. For example, a proximity sensor can provide information on the tool position environment relative to the surface of the material being worked on. Or, for example, a metal detector can provide information on whether metal is detected within the material being worked on. A haptic control signal or haptic drive signal can then be generated to produce the haptic signal. In embodiments where a separate haptic output device is provided, the signal can be a haptic drive signal to drive the haptic output device. In embodiments where the haptic noise source is used as the haptic output device, the signal can be a haptic drive signal controlling the haptic noise source, such as the device motor. For example, if the haptic noise source is a motor in a power tool, the haptic drive signal can comprise the electrical power source for the motor which can then be altered or modified to produce a distinctive haptic signal different from the normal haptic noise produced by the motor. In another embodiment, the signal can be a haptic drive signal to the motor to control the motor to behave in a particular way so as to produce a distinctive haptic signal over the normal haptic noise produced by the motor. In embodiments where the haptic output device is a material or actuator designed to dampen the haptic noise, the signal can be a haptic drive signal to the dampening material or dampening actuator to control the dampening material or dampening actuator.

Turning back to 440, if logic determines that the user should not be notified, then the flow proceeds to 420 where the tool task ends. If the user should be notified, then the flow proceeds to 450 where a haptic signal is provided on the device through the handle of the device or by a wearable device worn by the user. Providing the haptic signal can be accomplished by providing a haptic control signal to haptic drive circuit, such as haptic drive circuit 18, which in turn can provide a haptic drive signal to a haptic output device, such as an actuator, dampener, motor control, or motor power signal. A distinguishable haptic effect can be provided via the haptic output device. The distinguishable haptic effect can correspond to the haptic signal and be perceivable over the haptic noise according the threshold for perception, attention breakthrough, or pain as discussed above.

In some embodiments, haptic signals can be provided by haptic output devices located in or near the handle of the tool. The handle is the immediate contact point between the operator and tool. As such, the handle may be the best location on the device to provide haptic signals on the tool. Haptic signals can include any appropriate feedback such as vibrations, deformations, temperature changes, or electrotactile feedback. For example, deformation of the handle to make it smaller or bigger or shorter or longer can be used as a haptic signal for notification. Thermal feedback can be provided to make the tool hotter to touch, for example, if the motor is beginning to overheat.

In some embodiments, haptic signals can be provided on the device through a system consistent with system 10 of FIGS. 1A and 1B. In such embodiments, haptic signals can be provided on a haptic output device, such as haptic output device 18 of FIGS. 1A and 1B, located in or on the device to provide a haptic effect felt at the handle of the device by a user. For example, a tool can be a power tool that provides haptic noise through a motor and/or materials with which the power tool is interacting (e.g., wood, metal, plastic, etc.). A haptic signal can be determined based on an instruction to provide a haptic effect and the sensed environment. In some embodiments, the haptic signal can be determined so as to avoid outputting a haptic signal in the same frequency range as the haptic noise of the tool in operation. Noise characteristics of similar tools can be used or the noise characteristics of the tool can be sensed to determine appropriate parameters, such as intensity, frequency, deflection, etc., to use for the haptic signal. For example, in power tools with fairly high revolutions-per-minute ("RPMs"), a vibrotactile haptic effect can be provided in a vibration range around 40 Hz or less.

In some embodiments, haptic signals can be provided on the device through a system consistent with system 210 of FIG. 2. In such embodiments, haptic signals can be provided by a haptic output device located on a wearable device. For example, a haptic output device can be an actuator, heating element, or other haptic output device as described above. Some types or configurations of wearable devices will be more appropriate than others depending on the haptic output. For example, gloves may work well if the haptic signal is thermal and applied to the back of the hands, since they are sensitive. Wearable devices are discussed in further detail, below.

In some embodiments, haptic signals can be provided on the device through a system consistent with system 310 of FIG. 3. In such embodiments, haptic signals can be provided by altering or dampening the natural haptic noise associated with the tool to provide notifications, torque adjustment, or other messages. In particular, altering or modulating the haptic noise could be done to alert the operator of incorrect or sub-optimal tool operation. Altering the haptic noise can include using a haptic output manipulator such as manipulator 21 of FIG. 3 for changing the driving force of the power tool's motor to produce weaker and/or stronger haptic noise for a short period of time without detrimentally affecting the performance of the tool. The alteration of the driving force will create a haptic effect that can act as a haptic signal to cue the operator of the tool for some condition.

In some embodiments, altering the haptic noise can use, as output manipulator 21 of FIG. 3, electrical breakers at the source of the noise, such as the motor of the tool, to stop the rotation of the motor for short periods of time by enabling the breakers to toggle power on/off to the haptic noise source. For example, breakers could operate at 200 Hz to turn the motor on and off every 5 milliseconds for a total duration of 1 second. Frequency and duration can be adjusted and can be selected based on the type of information to be given to the user. For example, for highly urgent information the breakers can be enabled at a very high frequency. For less urgent information, breakers could be enabled at a lower frequency. Also, the breakers could be enabled at unequal intervals to further vary the types of information provided (e.g., a dying battery notification could turn off the motor for 5 milliseconds and enable the motor for 10 milliseconds, repeated for some duration). For repeated notifications, such as an initial notification regarding the battery dying and a follow up notification, the unequal intervals can be further varied. For the battery example, the off period could be gradually increased from 5 milliseconds to 12 milliseconds to give the user the perception that the battery is dying and requires attention. In other examples, the breakers can increase in frequency to demonstrate that the message is getting more important.

In some embodiments, dampening or masking the haptic noise can be accomplished at a frequency to provide a haptic signal to the user according to the frequency used to dampen the signal. Dampening can be achieved for example, by altering the stiffness of the material that conveys haptic information, such as making the device handle harder or softer or making dampening material in the handle more or less effective through an actuator or servo.

In some embodiments of the systems of FIGS. 1A, 1B, 2 and 3, the device may not have an integrated haptic noise source, but instead may produce haptic noise through the device's use and interaction with its environment. In such embodiments, haptic noise source 19 can be noise caused by this environmental interaction. In particular, any object can produce haptic noise if it interacts with another object. One example of such embodiments includes the use of sports equipment. For example, a skier skiing may generate a significant amount of haptic noise through the contact between skis and snow. The device, such as device 30, can be considered to be the skis. In embodiments consistent with FIGS. 1A and 1B, a haptic output device can be located on the device (e.g., the skis). In embodiments consistent with FIG. 2, a haptic output device can be located on a wearable device. In embodiments consistent with FIG. 3, the haptic output generated by the use of the device (e.g., the skiing) could be modified or altered to provide a distinct haptic effect (e.g., through the ski-boot connector) based on the haptic noise level of the device. Such distinctive haptic effects could inform the device operator. For example, distinctive haptic effects can inform a skier of snow or ice conditions, slope angle, hazards, coaching advice as to stance or position, and so forth. Sensors such as sensor 17 can provide bio-monitoring on which to further base a haptic effect. Bio-monitoring can include a heart rate monitor, galvanic skin response sensor, or other biological sensing. A haptic effect can be altered based on the bio-monitoring. For example, an increased heart rate may indicate that a stronger haptic effect is needed to achieve attention breakthrough. In another example, the device can be a tennis racquet that generates haptic noise when striking a tennis ball. In this case, the racquet would be considered the device and the implementation can follow similar to the skiing example. A distinctive haptic effect could, for example, notify a practicing player what adjustments should be made in racquet face angle, speed, and location in order to provide instant feedback to help improve the player's hitting. Other examples can include a cycler, swimmer, runner, batter, receiver, catcher, and so forth.

Another example of an object producing haptic noise as it interacts with another object can include a car seat. A vibration can be felt by the driver in the seat as the seat is mechanically coupled to the floorpan of the car, which is in turn mechanically coupled to the suspension system of the car, which is in turn mechanically coupled to the tires, which interact with the roadway. Road vibrations (and other suspension system vibrations) can create haptic noise. A haptic output device can be integrated into such objects to provide haptic effects. For example, an actuator can be integrated into a car seat to provide haptic effects depending on environmental conditions or notifications, where the haptic effects are selected based on the environmental conditions and haptic noise. The haptic effects can also be selected to overcome the threshold of perception, attention breakthrough, and/or pain.

Turning back to FIG. 4, at 460, the user can take optional corrective action depending on the haptic signal received. For example, the user could alter the use of the tool, stop using the tool, or perform some other action not directly related to the tool in response to the haptic signal. Flow can continue back to sensing at 430 if tool use continues or can continue to the end of the tool task at 420.

Figure 5:
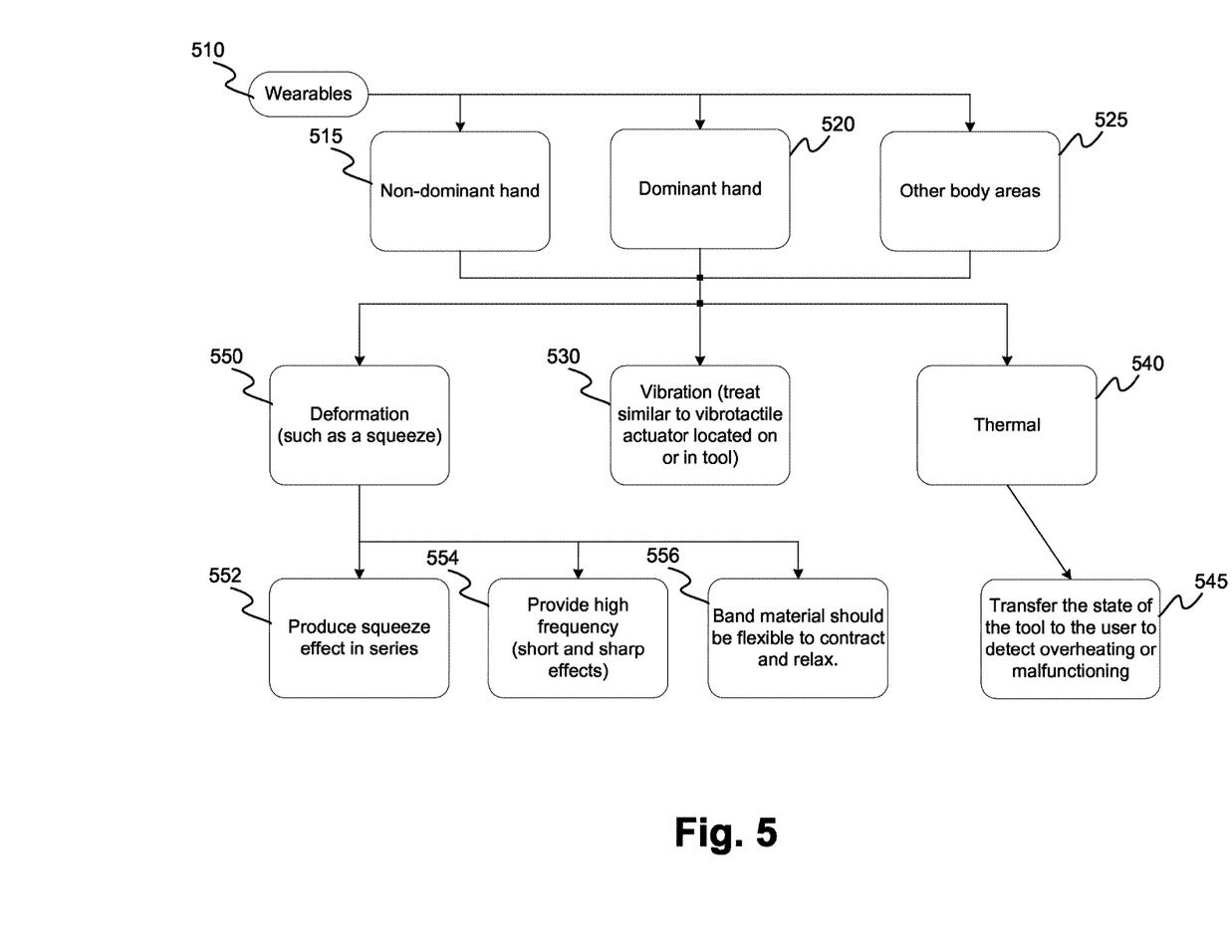
FIG. 5 is a flow diagram for providing a haptic effect in a haptically noisy environment using a wearable device in accordance with one embodiment.

FIG. 5 is a flow diagram for providing a haptic effect in a haptically noisy environment using a wearable device in accordance with one embodiment. Wearable devices such as wearable device 31 of FIG. 2 can be a wearable article that has an integrated haptic output device. Wearable articles can include things such as a wrist, arm, or finger wearable article, rings, gloves, goggles, or a hat. Some types of wearable devices are better suited to transmit certain types of effects. Wearable devices can provide a variety of haptic effects which can be more or less effective depending on the application. For example, wearable devices can vibrate using vibratory haptic actuators or squeeze using haptic output devices to shorten or tighten a strap. Haptic signals provided on the wearable device can be intense enough or of a distinctive character to make them discernible over the naturally generated haptic noise. Haptic signals can be chosen to meet one or more of the thresholds of perception, attention breakthrough, and/or pain as discussed above. An operator may prefer the wearable device on one hand or the other or on a dominant or non-dominant hand and can specify preferences as such to inform the system of where the wearable device is worn.

Turning back to FIG. 5, at 510, it is determined whether the wearable device is on the non-dominant hand, dominant hand, or some other location on the body. The location of the wearable device can be determined by settings in the device which can be set according to the preferences specified by the user. At 515, if the wearable device is on the non-dominant hand, then adjustments can be made to a haptic control signal or haptic drive signal to accommodate that the wearable device is on the non-dominant hand. For example, presumably a one-handed tool will be operated by a user using the user's dominant hand. As such, haptic noise is typically generated and located further from the non-dominant hand than the dominant hand, and as a result the thresholds of perception, attention breakthrough, and pain will be lower than if the wearable device was worn on the dominant hand. Haptic signals can be attenuated for non-dominant hand worn wearable devices or amplified for dominant hand-worn wearable devices by adjusting the haptic control signal or haptic drive signal for the haptic effect. At 520, dominant hand wearable devices are considered. The underlying logic remains the same for either dominant hand or non-dominant hand-worn wearable devices, however, as discussed, the intensity of the haptic effects could be adjusted. Another option at 525 is that the wearable device could be worn on another body part, such as with a hat, goggles, anklet, and so forth. These cases could be considered similar to the non-dominant hand case since the wearable device would likely be further from the source of the haptic noise and presumably easier to perceive, i.e., the threshold for perception, attention breakthrough, and pain will be lower than if the wearable device were worn closer to the source of the haptic noise.

The flow of FIG. 5 moves back together and, at 530, if the haptic effect is vibration based, such as provided by a vibrotactile actuator, then a haptic signal can be provided that is similar to, but distinct from, the haptic noise from the tool itself, as discussed above. In particular, a fairly low frequency vibration can be more effective than higher frequency vibrations that may overlap more with the frequencies being naturally generated by the haptic noise of the tool. At 540, if the haptic effect is thermal, then a thermal haptic effect can be provided. In one embodiment, at 545, thermal haptics can be incorporated into a wearable device to mimic (proportionally or with safety precautions against burns) the thermal condition of the tool to inform the operator of a possible overheating or malfunctioning condition of the tool. The state of the tool can be sensed by a sensor and transferred to the wearable device through a wire or wirelessly by a wireless medium to be used for determining the thermal haptic feedback.

At 550, if the haptic effect is a deformation, such as a squeeze effect, then the haptic signal can be provided on a wrist strap or on gloves. Some properties of squeeze effects are illustrated by 552, 554, and 556. At 552, strong sharp squeezes in series (e.g., nine in quick succession) can be applied. At 554, high frequency squeezes of around 200 Hz can work well for a short and sharp squeezing effect. At 556, a wearable device, such as a band, that is made to squeeze should be made of strong material, but flexible, like a strong synthetic fiber or rubber.

In some embodiments (not pictured), wearable device can be used effectively for haptic signals based on the remote operation of a tool or device. In such embodiments, the tool or device for which feedback is derived, such as device 30 may or may not be in close proximity to the wearable. Haptic noise can come from device 30 and/or other devices or haptic noise sources in the environment of the wearable. A haptic signal can be provided to an operator or another person, such as the operator's supervisor or other interested party through a wearable or multiple wearable in an interactive network. In some embodiments, a user with a wearable can select preferences to specify what kind of haptic signals (and notifications) they would like to receive on which devices. For example, an operator's supervisor can wear a wearable device and configure it to receive highly urgent alert notifications for immediate notification, while configuring his phone to receive less urgent notifications for possibly delayed viewing.

Figure 6:
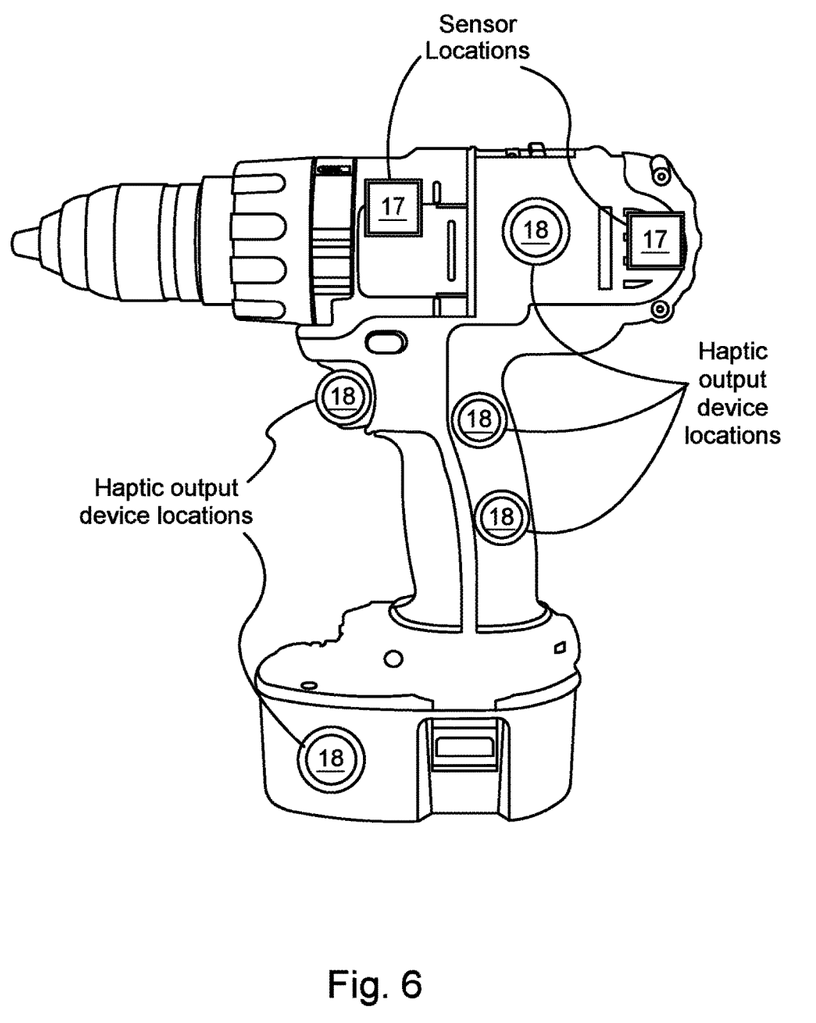
FIG. 6 is an illustration of a power tool that shows some possible locations for a sensor and haptic output devices in accordance with one embodiment.

FIG. 6 is an illustration of a power tool that shows some possible locations for sensor 17 of FIGS. 1A, 1B, 2 and 3 and haptic output devices 18 of FIGS. 1A and 1B in accordance with one embodiment. Sensor 17 and one or more of haptic output devices 18 can be placed anywhere on the device. In particular, as illustrated, haptic output devices 18 can be placed on the drill's trigger button, handle, battery, or motor casing. They can be placed inside or outside the drill's body. In one embodiment, haptic output device 18 can be a coin-type ERM actuator.

As disclosed, embodiments provide a system for generating haptic effects in a haptically noisy system that are perceivable over the haptic noise. Haptic effects can be generated by a separate haptic output device located on the device, a wearable device separate from the device, or on the device by altering or dampening the haptic noise. Sensors can be integrated into the device to monitor operative conditions of the device. Haptic effects can provide notification information related to the operation of the device.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A vehicle haptic generation system, comprising:
   a sensor configured to detect a plurality of vibrations in a vehicle;
   a wearable device having a haptic output device configured to provide haptic feedback in response to the detected plurality of vibrations, wherein the haptic feedback comprises a squeeze effect; and
   a haptic output device drive circuit configured to dynamically adjust a parameter of the haptic feedback based on the detected plurality of vibrations.

2. The system of claim 1, wherein the haptic output device is integrated into a wrist strap, the wrist strap being part of the wearable device, wherein the wearable device is in wireless communication with a processor in the vehicle.

3. The system of claim 1, wherein the haptic feedback is selected based on an environmental condition.

4. The system of claim 3, wherein the environmental condition includes road vibrations.

* * * * *